US012020615B2

(12) United States Patent
Pyun et al.

(10) Patent No.: US 12,020,615 B2
(45) Date of Patent: Jun. 25, 2024

(54) DISPLAY APPARATUS OPERATING AN OVERCURRENT PROTECTION BASED ON A CLOCK RECOVERY SIGNAL AND METHOD OF DRIVING THE SAME

(71) Applicant: Samsung Display Co., Ltd., Yongin-Si (KR)

(72) Inventors: Kihyun Pyun, Gwangmyeong-si (KR); Kyoungho Lim, Hwaseong-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 53 days.

(21) Appl. No.: 17/569,802

(22) Filed: Jan. 6, 2022

(65) Prior Publication Data

US 2022/0309979 A1 Sep. 29, 2022

(30) Foreign Application Priority Data

Mar. 25, 2021 (KR) ........................ 10-2021-0039147

(51) Int. Cl.
*G09G 3/20* (2006.01)

(52) U.S. Cl.
CPC ....... *G09G 3/20* (2013.01); *G09G 2300/0857* (2013.01); *G09G 2330/02* (2013.01); *G09G 2330/045* (2013.01)

(58) Field of Classification Search
None
See application file for complete search history.

(56) References Cited

U.S. PATENT DOCUMENTS

2012/0299974 A1* 11/2012 Park ..................... G09G 3/3688 345/690
2017/0162092 A1* 6/2017 Kim ......................... G09G 3/20
2020/0154572 A1* 5/2020 Choi .................... H05K 1/0224
2020/0184867 A1* 6/2020 Choi ...................... G09G 3/006
2022/0139325 A1* 5/2022 Lee ......................... G06F 3/147 345/694
2022/0157244 A1* 5/2022 Kwon .................. G09G 3/3291
2022/0180814 A1* 6/2022 Jung ...................... G09G 5/006
2022/0198989 A1* 6/2022 Park ....................... G09G 5/008

FOREIGN PATENT DOCUMENTS

KR 100639005 B1 10/2006
KR 100844770 B1 7/2008
KR 101056281 B1 8/2011

* cited by examiner

*Primary Examiner* — Amr A Awad
*Assistant Examiner* — Donna V Bocar
(74) *Attorney, Agent, or Firm* — CANTOR COLBURN LLP

(57) ABSTRACT

A display apparatus includes a display panel, a data driver, a driving controller and a power voltage generator. The display panel displays an image. The data driver outputs a data voltage to the display panel. The driving controller controls an operation of the data driver. The power voltage generator outputs a power voltage of the display panel. The data driver outputs a clock recovery signal representing whether a clock recovery operation is normal or abnormal to the driving controller. The driving controller generates an overcurrent signal representing an overcurrent based on the clock recovery signal and outputs the overcurrent signal to the power voltage generator.

17 Claims, 11 Drawing Sheets

DISPLAY APPARATUS OPERATING AN OVERCURRENT PROTECTION BASED ON A CLOCK RECOVERY SIGNAL AND METHOD OF DRIVING THE SAME

This application claims priority to Korean Patent Application No. 10-2021-0039147, filed on Mar. 25, 2021, and all the benefits accruing therefrom under 35 U.S.C. § 119, the content of which in its entirety is herein incorporated by reference.

BACKGROUND

1. Field

Embodiments of the invention relate to a display apparatus and a method of driving the display apparatus. More particularly, embodiments of the invention relate to a display apparatus operating an overcurrent protection based on a clock recovery signal and a method of driving the display apparatus.

2. Description of the Related Art

Generally, a display apparatus includes a display panel and a display panel driver. The display panel includes a plurality of gate lines and a plurality of data lines. The display panel driver includes a gate driver, a data driver and a driving controller. The gate driver outputs gate signals to the gate lines. The data driver outputs data voltages to the data lines. The driving controller controls the gate driver and the data driver.

The driving controller and the data driver may send and receive a data signal and a control signal.

SUMMARY

When a damage occurs at a driving controller, a data driver or a transmission path between the driving controller and the data driver and a power voltage is continuously applied to a display panel, the display panel may be damaged due to an overheating.

Embodiments of the invention provide a display apparatus operating an overcurrent protection based on a clock recovery signal to prevent an overheating of a display panel and a damage of the display panel.

Embodiments of the invention also provide a method of driving the display apparatus.

In an embodiment of a display apparatus according to the invention, the display apparatus includes a display panel, a data driver, a driving controller and a power voltage generator. The display panel displays an image. The data driver outputs a data voltage to the display panel. The driving controller controls an operation of the data driver. The power voltage generator outputs a power voltage of the display panel. The data driver outputs a clock recovery signal representing whether a clock recovery operation is normal or abnormal to the driving controller. The driving controller generates an overcurrent signal representing an overcurrent based on the clock recovery signal and outputs the overcurrent signal to the power voltage generator.

In an embodiment, when the overcurrent signal has an active state, the power voltage generator may not output the power voltage.

In an embodiment, the driving controller may output a clock training signal representing a clock training period to the data driver.

In an embodiment, the driving controller may include a flipflop which receives the clock recovery signal and the clock training signal and outputs a clock state signal.

In an embodiment, when the clock recovery signal represents a normal state, the clock state signal may have a high level at a rising edge of the clock training signal.

In an embodiment, when the clock recovery signal represents an abnormal state, the clock state signal may have a low level at the rising edge of the clock training signal.

In an embodiment, the driving controller may further include an inverter which generates an inverted state signal by inverting the clock state signal and a counter which generates a count signal by counting the inverted state signal.

In an embodiment, the driving controller may further include an overcurrent protection controller which sets the overcurrent signal to have the active state when the count signal exceeds a reference count signal.

In an embodiment, the driving controller may further include a counter which generates a count signal by counting the clock state signal.

In an embodiment, the driving controller may further include an overcurrent protection controller which sets the overcurrent signal to have the active state when the count signal exceeds a reference count signal.

In an embodiment, an interface signal outputted from the driving controller to the data driver may include a clock training pattern corresponding to the clock training period and a data signal corresponding to a data period. The data driver may operate the clock recovery operation in the clock training period.

In an embodiment, when the clock recovery operation is normal, the clock recovery signal may have a high level. When the clock recovery operation is abnormal, the clock recovery signal may have a low level.

In an embodiment, the display apparatus may further include a control board on which the driving controller is disposed, a first printed circuit board, a second printed circuit board, a flexible film connected to the second printed circuit board and the control board and a U-film connected to the first printed circuit board and the second printed circuit board.

In an embodiment, the display apparatus may further include a plurality of first data films connected between the first printed circuit board and the display panel, a plurality of first data driving chips disposed on the plurality of first data films, a plurality of second data films connected between the second printed circuit board and the display panel and a plurality of second data driving chips disposed on the plurality of second data films.

In an embodiment, the clock recovery signal outputted from the first data driving chip may be transmitted to the driving controller through a first data film of the plurality of first data films, the first printed circuit board, the U-film, the second printed circuit board, the flexible film and the control board.

In an embodiment of a method of driving a display apparatus according to the invention, the method includes outputting a clock recovery signal representing whether a clock recovery operation of a data driver is normal or abnormal to a driving controller, generating an overcurrent signal representing an overcurrent based on the clock recovery signal, outputting a power voltage to a display panel based on the overcurrent signal and outputting a data voltage to the display panel using the data driver.

In an embodiment, when the overcurrent signal has an active state, a power voltage generator may not output the power voltage.

In an embodiment, the driving controller may output a clock training signal representing a clock training period to the data driver.

In an embodiment, the driving controller may include a flipflop which receives the clock recovery signal and the clock training signal and outputs a clock state signal. When the clock recovery signal represents a normal state, the clock state signal may have a high level at a rising edge of the clock training signal. When the clock recovery signal represents an abnormal state, the clock state signal may have a low level at the rising edge of the clock training signal.

In an embodiment, an interface signal outputted from the driving controller to the data driver may include a clock training pattern corresponding to the clock training period and a data signal corresponding to a data period. The data driver may operate the clock recovery operation in the clock training period. When the clock recovery operation is normal, the clock recovery signal may have a high level. When the clock recovery operation is abnormal, the clock recovery signal may have a low level.

According to the display apparatus and the method of driving the display apparatus, the data driver outputs the clock recovery signal to the driving controller and the driving controller determines the overcurrent based on the clock recovery signal and outputs the overcurrent signal to the power voltage generator. When the power voltage generator receives the overcurrent signal having the active state, the power voltage generator may not output the power voltage to the display panel.

Accordingly, when the damage occurs at the driving controller, the data driver or the transmission path between the driving controller and the data driver, the overcurrent protection operation may be operated so that the overheating and the damage of the display panel may be prevented.

BRIEF DESCRIPTION OF THE DRAWINGS

The above and other features and advantages of the invention will become more apparent by describing in detailed embodiments thereof with reference to the accompanying drawings, in which.

DETAILED DESCRIPTION

Figure 1:
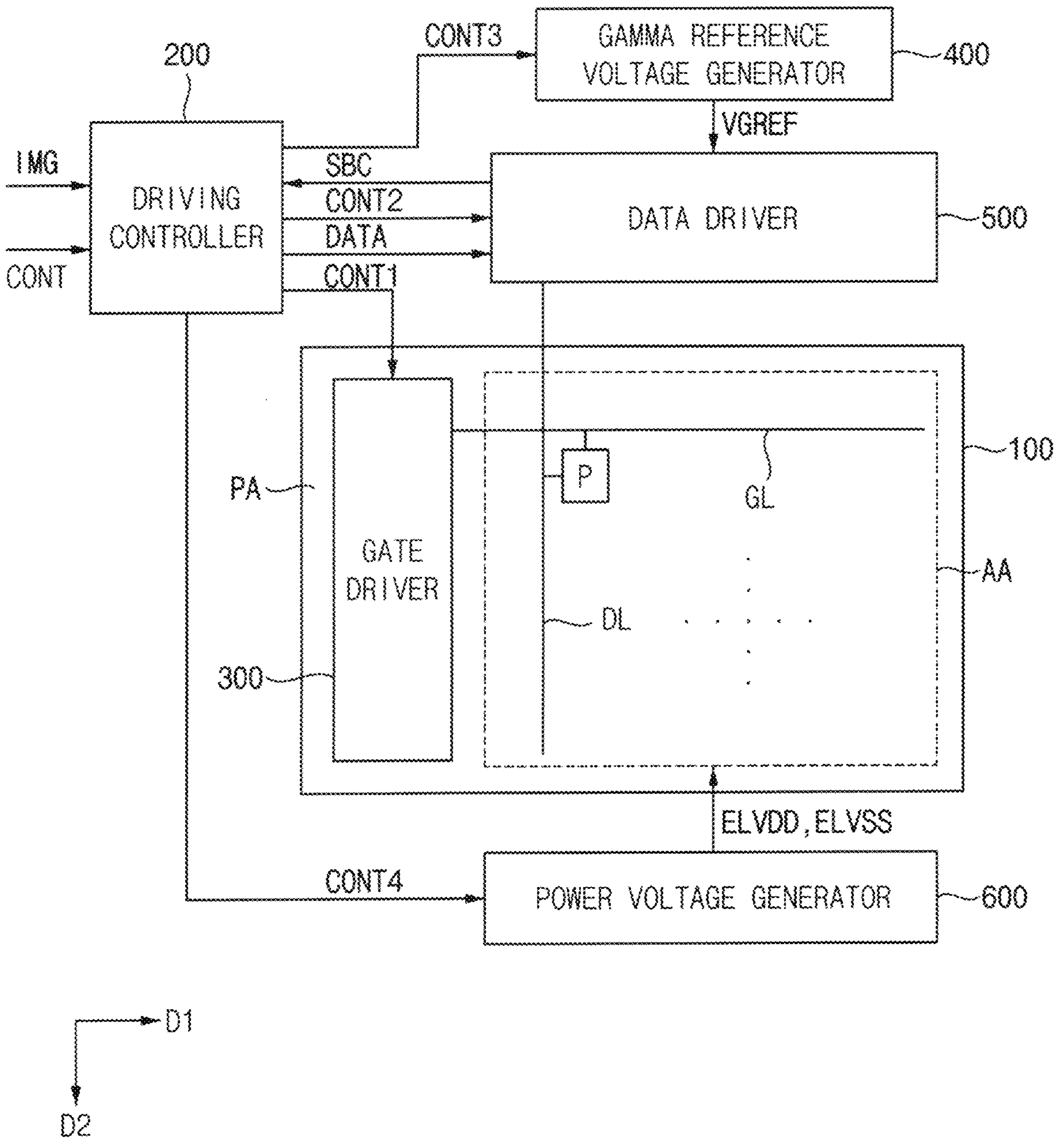
FIG. 1 is a block diagram illustrating an embodiment of a display apparatus according to the invention.

Hereinafter, the invention will be explained in detail with reference to the accompanying drawings.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this invention will be thorough and complete, and will fully convey the scope of the invention to those skilled in the art. Like reference numerals refer to like elements throughout.

It will be understood that when an element is referred to as being "on" another element, it can be directly on the other element or intervening elements may be therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. In an embodiment, when the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, when the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). The term "about" can mean within one or more standard deviations, or within ±30%, 20%, 10%, 5% of the stated value, for example.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the invention, and will not be interpreted in an idealized or overly formal sense unless expressly so defined herein.

Embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. In an embodiment, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the claims.

FIG. 1 is a block diagram illustrating an embodiment of a display apparatus according to the invention.

Referring to FIG. 1, the display apparatus includes a display panel 100 and a display panel driver. The display panel driver includes a driving controller 200, a gate driver 300, a gamma reference voltage generator 400 and a data driver 500. The display panel driver may further include a power voltage generator 600.

The display panel 100 has a display region AA on which an image is displayed and a peripheral region PA adjacent to the display region AA.

The display panel 100 includes a plurality of gate lines GL, a plurality of data lines DL and a plurality of pixels P connected to the corresponding gate lines GL and the corresponding data lines DL. The gate lines GL extend in a first direction D1 and the data lines DL extend in a second direction D2 crossing the first direction D1.

The driving controller 200 receives input image data IMG and an input control signal CONT from an external apparatus. In an embodiment, the input image data IMG may include red image data, green image data and blue image data. In an embodiment, the input image data IMG may alternatively or additionally include white image data. In an embodiment, the input image data IMG may alternatively or additionally include magenta image data, yellow image data and cyan image data. The input control signal CONT may include a master clock signal and a data enable signal. The input control signal CONT may further include a vertical synchronizing signal and a horizontal synchronizing signal.

The driving controller 200 generates a first control signal CONT1, a second control signal CONT2, a third control signal CONT3, a fourth control signal CONT4 and a data signal DATA based on the input image data IMG and the input control signal CONT.

The driving controller 200 generates the first control signal CONT1 for controlling an operation of the gate driver 300 based on the input control signal CONT, and outputs the first control signal CONT1 to the gate driver 300. The first control signal CONT1 may further include a vertical start signal and a gate clock signal.

The driving controller 200 generates the second control signal CONT2 for controlling an operation of the data driver 500 based on the input control signal CONT, and outputs the second control signal CONT2 to the data driver 500. The second control signal CONT2 may include a horizontal start signal and a load signal.

In the illustrated embodiment, the second control signal CONT2 may further include a clock training signal representing a clock training period. In the illustrated embodiment, the driving controller 200 may receive a clock recovery signal SBC representing whether a clock recovery operation is normal or abnormal from the data driver 500.

The driving controller 200 generates the data signal DATA based on the input image data IMG. The driving controller 200 outputs the data signal DATA to the data driver 500.

The driving controller 200 generates the third control signal CONT3 for controlling an operation of the gamma reference voltage generator 400 based on the input control signal CONT, and outputs the third control signal CONT3 to the gamma reference voltage generator 400.

The gate driver 300 generates gate signals driving the gate lines GL in response to the first control signal CONT1 received from the driving controller 200. The gate driver 300 outputs the gate signals to the gate lines GL. In an embodiment, the gate driver 300 may sequentially output the gate signals to the gate lines GL, for example.

In an embodiment, the gate driver 300 may be disposed (e.g., integrated) on the peripheral region PA of the display panel 100.

The gamma reference voltage generator 400 generates a gamma reference voltage VGREF in response to the third control signal CONT3 received from the driving controller 200. The gamma reference voltage generator 400 provides the gamma reference voltage VGREF to the data driver 500. The gamma reference voltage VGREF has a value corresponding to a level of the data signal DATA.

In an embodiment, the gamma reference voltage generator 400 may be disposed in the driving controller 200, or in the data driver 500.

The data driver 500 receives the second control signal CONT2 and the data signal DATA from the driving controller 200, and receives the gamma reference voltages VGREF from the gamma reference voltage generator 400. The data driver 500 converts the data signal DATA into data voltages having an analog type using the gamma reference voltages VGREF. The data driver 500 outputs the data voltages to the data lines DL.

The power voltage generator 600 may output a power voltage to the pixels P of the display panel 100. In an embodiment, the power voltage generator 600 may output a first power voltage ELVDD and a second power voltage ELVSS having a voltage level less than that of the first power voltage ELVDD, for example.

In an embodiment, the power voltage generator 600 may generate the first power voltage ELVDD and the second power voltage ELVSS in response to the fourth control signal CONT4 received from the driving controller 200, for example. In an embodiment, the fourth control signal CONT4 may include an overcurrent signal representing that an overcurrent flows through the display apparatus, for example.

Figure 2:
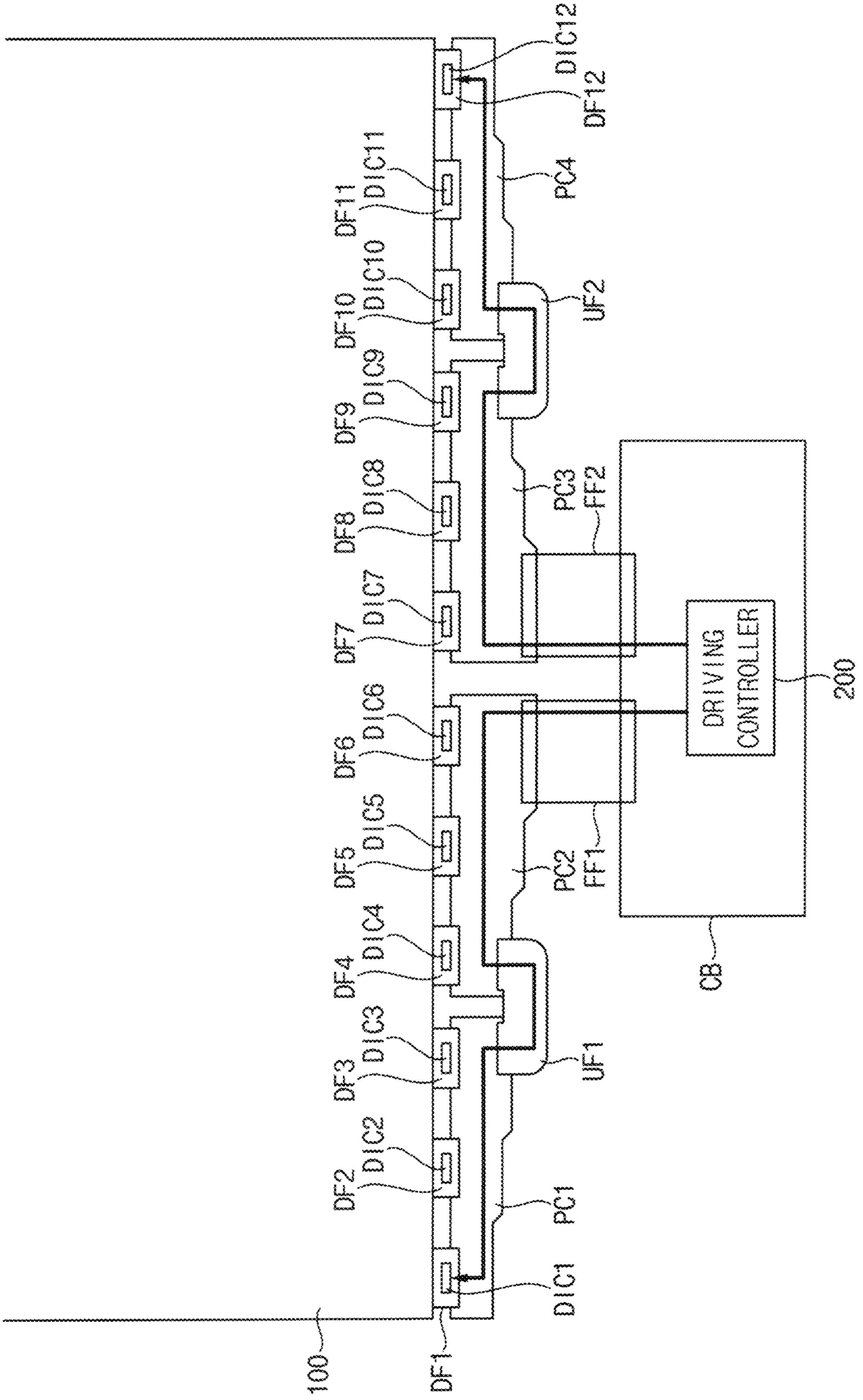
FIG. 2 is a plan view illustrating a display apparatus of FIG. 1.

FIG. 2 is a plan view illustrating a display apparatus of FIG. 1.

Referring to FIGS. 1 and 2, for example, the display apparatus may further include a control board CB, a first printed circuit board PC1, a second printed circuit board PC2, a first flexible film FF1 connected to the second printed circuit board PC2 and the control board CB and a first U-film UF1 connected to the first printed circuit board PC1 and the second printed circuit board PC2.

In an embodiment, the display apparatus may further include a third printed circuit board PC3, a fourth printed circuit board PC4, a second flexible film FF2 connected to the third printed circuit board PC3 and the control board CB and a second U-film UF2 connected to the third printed circuit board PC3 and the fourth printed circuit board PC4, for example.

In an embodiment, the display apparatus may further include a plurality of data films DF1, DF2 and DF3 connected between the first printed circuit board PC1 and the display panel 100 and a plurality of data driving chips DIC1, DIC2 and DIC3 respectively disposed on the data films DF1, DF2 and DF3, a plurality of data films DF4, DF5 and DF6 connected between the second printed circuit board PC2 and the display panel 100 and a plurality of data driving chips DIC4, DIC5 and DIC6 respectively disposed on the data films DF4, DF5 and DF6, for example.

In an embodiment, the display apparatus may further include a plurality of data films DF7, DF8 and DF9 connected between the third printed circuit board PC3 and the display panel 100 and a plurality of data driving chips DICT, DIC8 and DIC9 respectively disposed on the data films DF7, DF8 and DF9, a plurality of data films DF10, DF11 and DF12 connected between the fourth printed circuit board PC4 and the display panel 100 and a plurality of data driving chips DIC10, DIC11 and DIC12 respectively disposed on the data films DF10, DF11 and DF12, for example.

Although the number of the data driving chips DIC1 to DIC12 connected to the display panel 100 is twelve in the illustrated embodiment, the invention may not be limited to the number of the data driving chips.

The driving controller 200 and the data driver 500 may send and receive the control signal and the data signal through an input and output interface. In an embodiment, the driving controller 200 and the data driver 500 may send and receive the control signal and the data signal through unified standard interface for TV("USI-T"), for example.

In FIG. 2, a signal transmission path between a first data driving chip DIC1 and the driving controller 200 and a signal transmission path between a twelfth data driving chip DIC12 and the driving controller 200 are illustrated.

Figure 3:
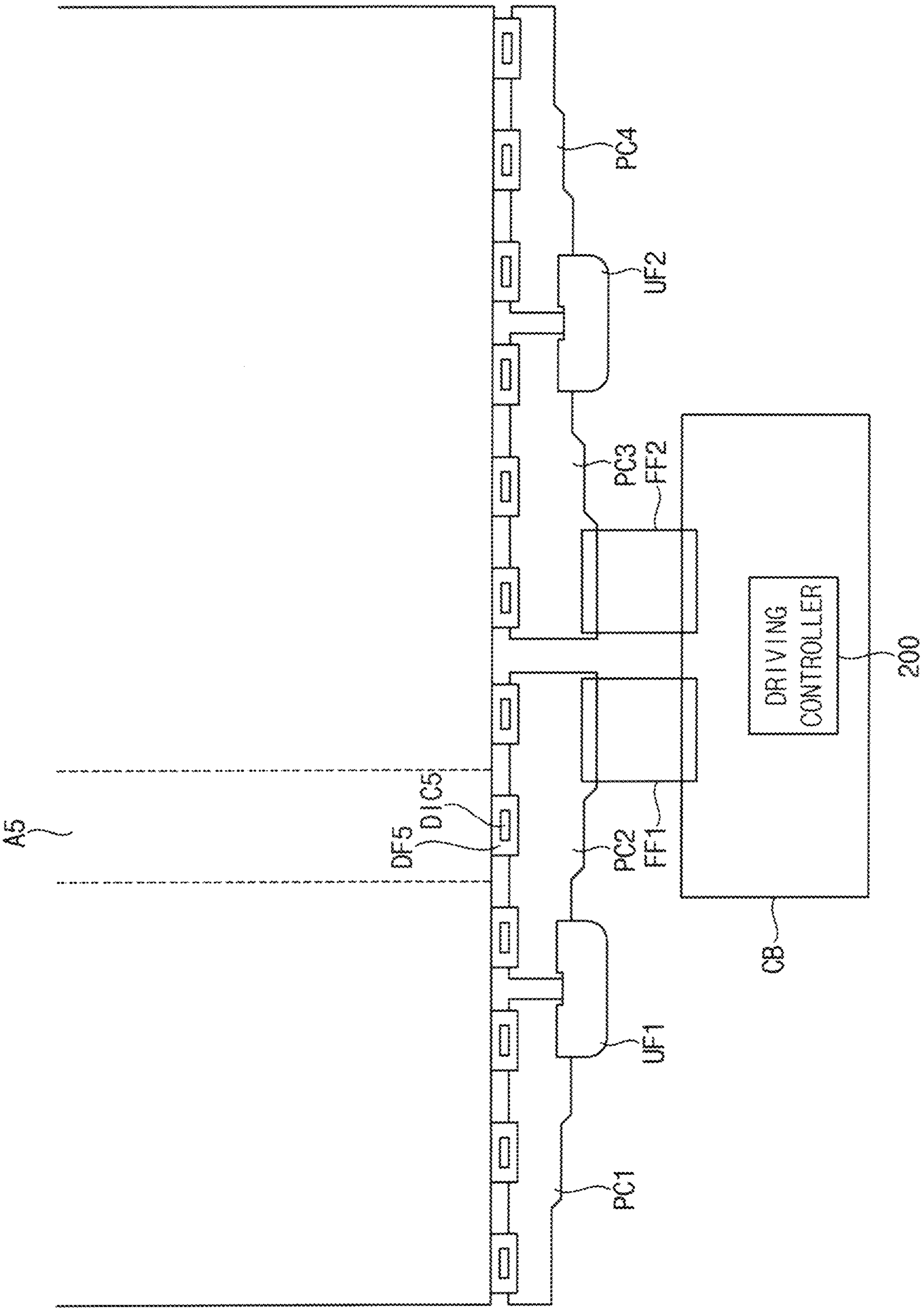
FIG. 3 is a conceptual diagram illustrating a case in which a damage occurs at a data driving chip of FIG. 2.

FIG. 3 is a conceptual diagram illustrating a case in which a damage occurs at the data driving chip (e.g., DIC5) of FIG. 2.

Referring to FIGS. 1 to 3, for example, the damage may be occurred at the driving controller 200, the data driving chips DIC1 to DIC12 or a transmission path between the driving controller 200 and the data chips DIC1 to DIC12.

In an embodiment, FIG. 3 represents a case in which a damage occurs at a fifth data driving chip DIC5, for example. In this case, a fifth area A5 of the display panel 100 corresponding to the fifth data driving chip DIC5 may not normally display an image.

When the damage occurs at the fifth data driving chip DIC5 and the first power voltage ELVDD is continuously applied to the display panel 100, the display panel 100 may be damaged due to an overheating.

Figure 4:
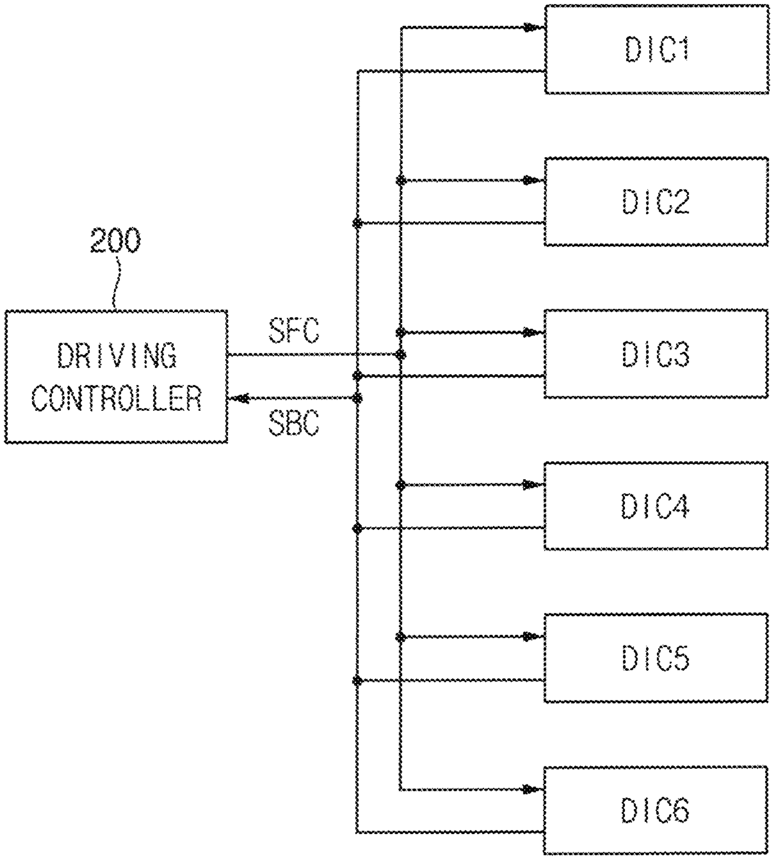
FIG. 4 is a conceptual diagram illustrating a clock recovery signal and a clock training signal transmitted between the driving controller and the data driver of FIG. 1.

FIG. 4 is a conceptual diagram illustrating the clock recovery signal SBC and the clock training signal SFC transmitted between the driving controller 200 and the data driver 500 of FIG. 1.

Referring to FIGS. 1 to 4, the driving controller 200 may respectively output the clock training signal SFC representing the clock training period to the data driving chips DIC1 to DIC6.

The data driving chips DIC1 to DIC6 may operate the clock recovery operation in the clock training period.

The data driving chips DIC1 to DIC6 may output the clock recovery signals SBC representing whether the clock recovery operations of the data driving chips DIC1 to DIC6 are normal or abnormal.

Although the first to sixth data driving chips DIC1 to DIC6 are illustrated in FIG. 4 for convenience of explanation, the driving controller 200 may output the clock training signal SFC to all of the data driving chips of the data driver 500 and all of the data driving chips of the data driver 500 may output the clock recovery signals SBC to the driving controller 200.

Figure 5:
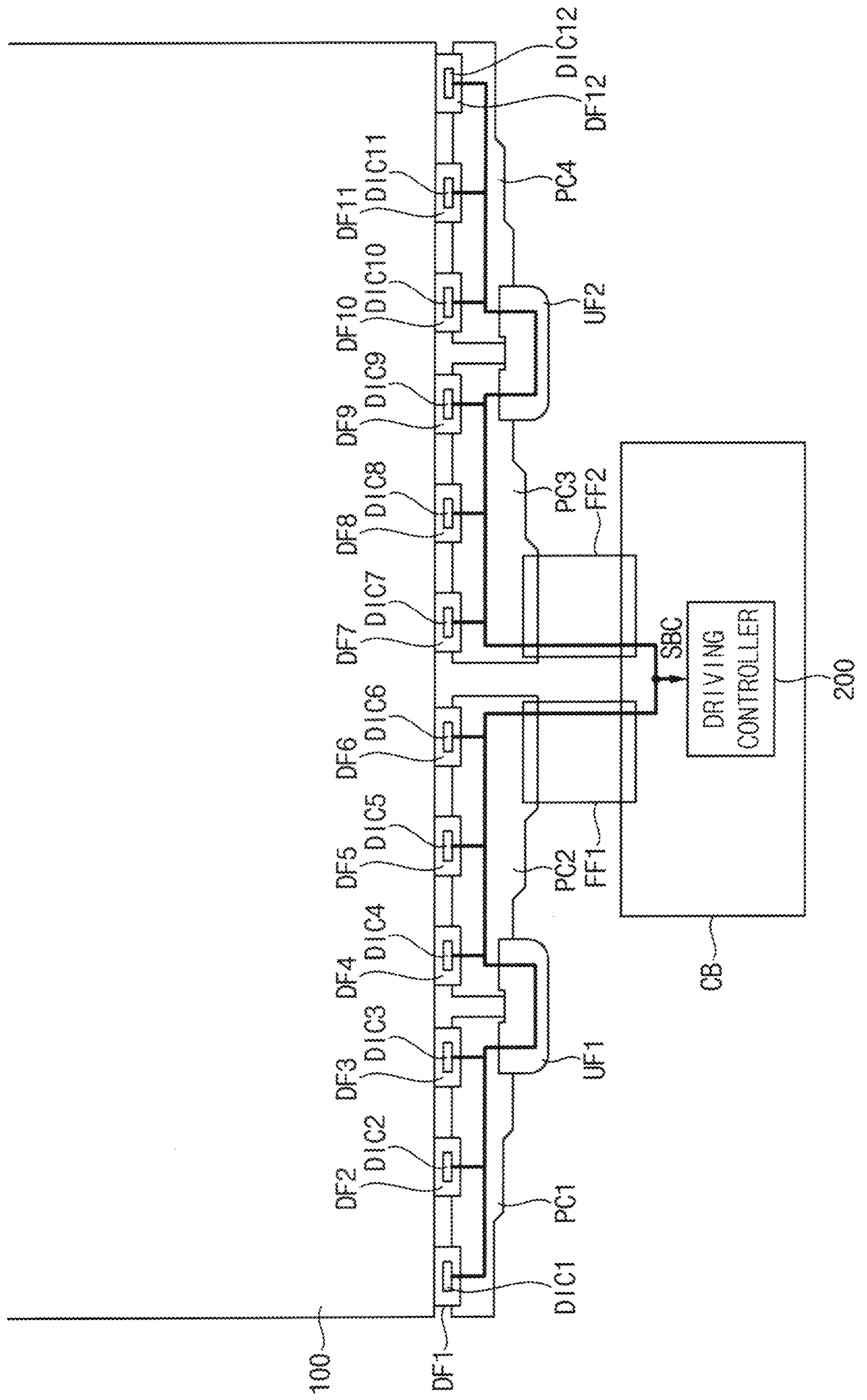
FIG. 5 is a plan view illustrating a transmission path of the clock recovery signal from data driving chips of FIG. 2 to the driving controller of FIG. 2.
Figure 6:
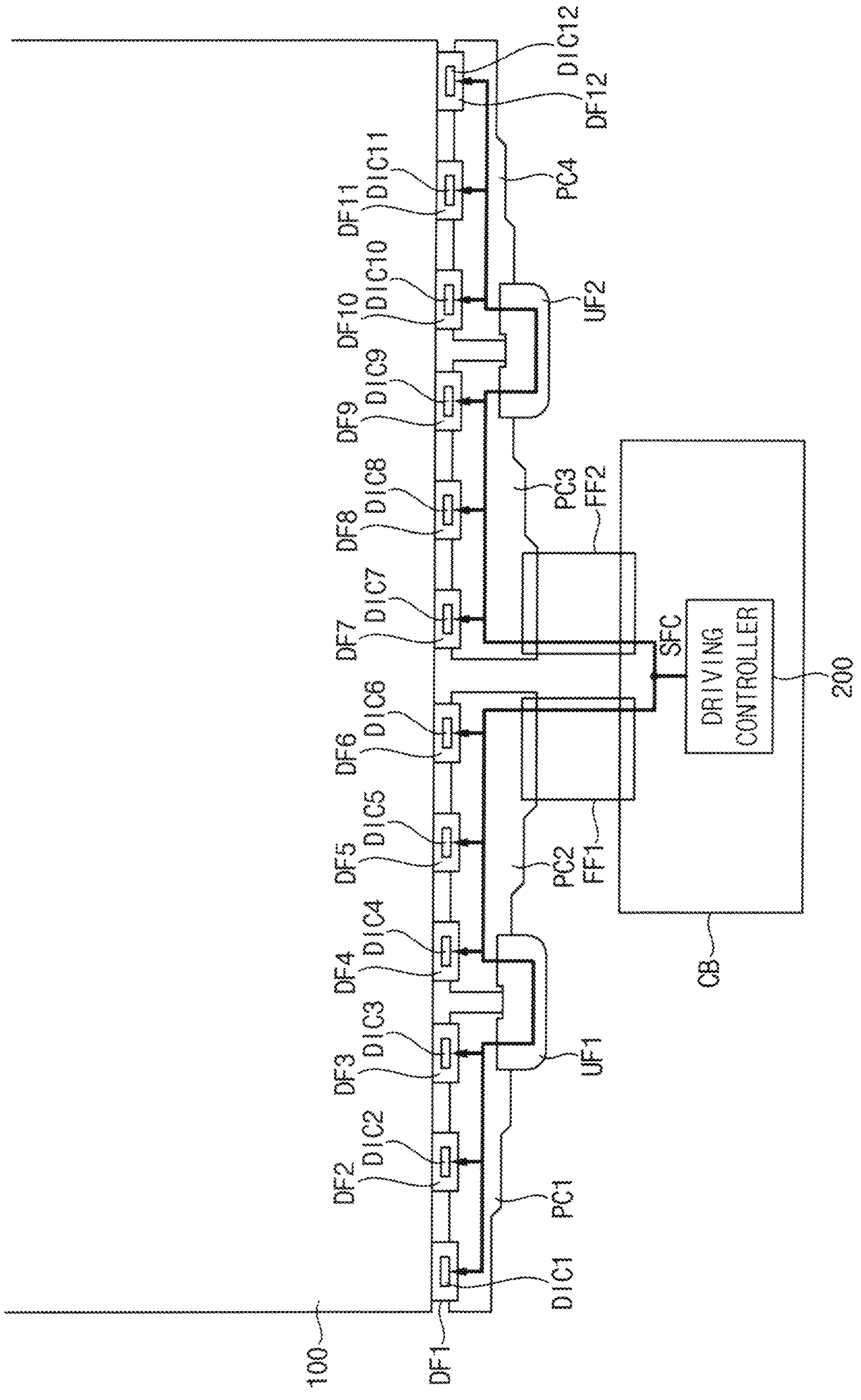
FIG. 6 is a plan view illustrating a transmission path of the clock training signal from the driving controller of FIG. 2 to the data driving chips of FIG. 2.

FIG. 5 is a plan view illustrating a transmission path of the clock recovery signal SBC from data driving chips DIC1 to DIC12 of FIG. 2 to the driving controller 200 of FIG. 2. FIG. 6 is a plan view illustrating a transmission path of the clock training signal SFC from the driving controller 200 of FIG. 2 to the data driving chips DIC1 to DIC12 of FIG. 2.

Referring to FIGS. 1 to 6, for example, the clock recovery signal SBC outputted from the first data driving chip DIC1 may be transmitted to the driving controller 200 through the first data film DF1, the first printed circuit board PC1, the first U-film UF1, the second printed circuit board PC2, the first flexible film FF1 and the control board CB. The driving controller 200 may be disposed on the control board CB.

The clock training signal SFC transmitted from the driving controller 200 to the first data driving chip DIC1 may be transmitted in an opposite direction of the transmission path of the clock recovery signal SBC outputted from the first data driving chip DIC1 explained above.

In an embodiment, the clock recovery signal SBC outputted from the fourth data driving chip DIC4 may be transmitted to the driving controller 200 through the fourth data film DF4, the second printed circuit board PC2, the first flexible film FF1 and the control board CB, for example.

The clock training signal SFC transmitted from the driving controller 200 to the fourth data driving chip DIC4 may be transmitted in an opposite direction of the transmission path of the clock recovery signal SBC outputted from the fourth data driving chip DIC4 explained above.

In an embodiment, the clock recovery signal SBC outputted from the seventh data driving chip DIC7 may be transmitted to the driving controller 200 through the seventh data film DF7, the third printed circuit board PC3, the second flexible film FF2 and the control board CB, for example.

The clock training signal SFC transmitted from the driving controller 200 to the seventh data driving chip DIC7 may be transmitted in an opposite direction of the transmission path of the clock recovery signal SBC outputted from the seventh data driving chip DIC7 explained above.

In an embodiment, the clock recovery signal SBC outputted from the tenth data driving chip DIC10 may be transmitted to the driving controller 200 through the tenth data film DF10, the fourth printed circuit board PC4, the second U-film UF2, the third printed circuit board PC3, the second flexible film FF2 and the control board CB, for example.

The clock training signal SFC transmitted from the driving controller 200 to the tenth data driving chip DIC10 may be transmitted in an opposite direction of the transmission path of the clock recovery signal SBC outputted from the tenth data driving chip DIC10 explained above.

Figure 7:
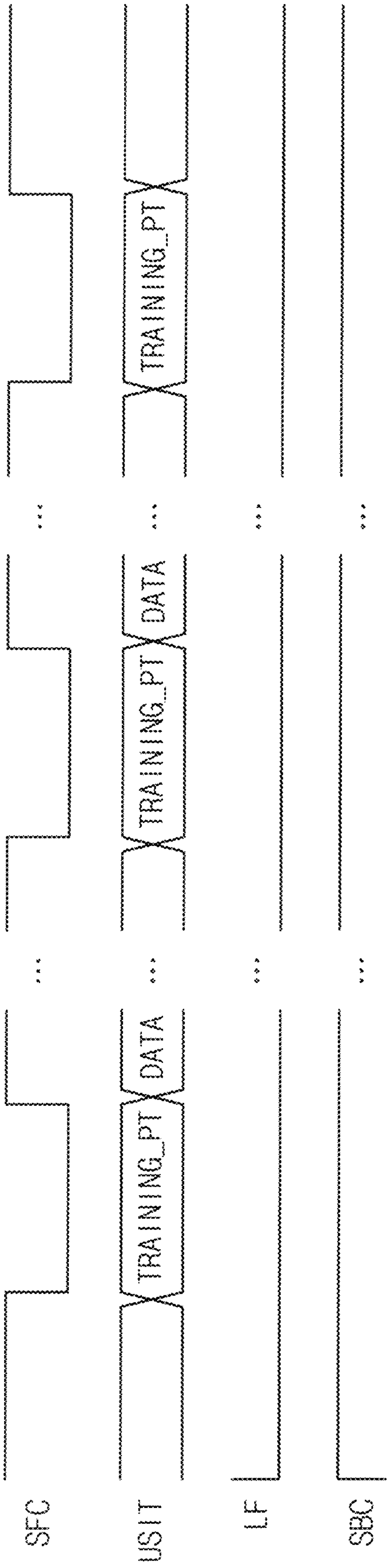
FIG. 7 is a timing diagram illustrating signals between the data driving chips of FIG. 2 and the driving controller of FIG. 2 in a normal state.
Figure 8:
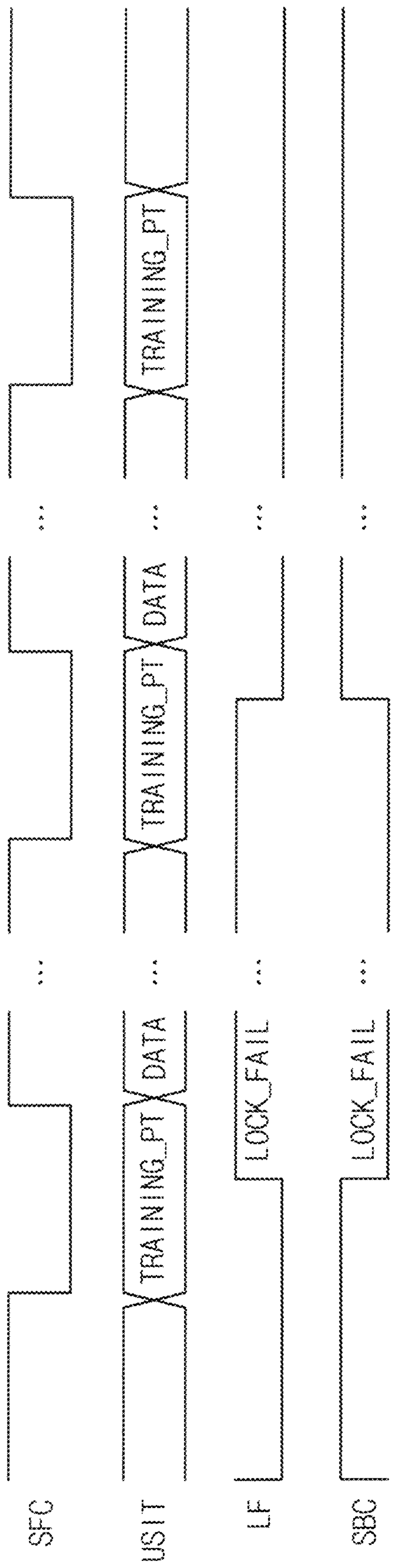
FIG. 8 is a timing diagram illustrating signals between the data driving chips of FIG. 2 and the driving controller of FIG. 2 in a lock fail state.

FIG. 7 is a timing diagram illustrating signals between the data driving chips of FIG. 2 and the driving controller of FIG. 2 in a normal state. FIG. 8 is a timing diagram illustrating signals between the data driving chips of FIG. 2 and the driving controller of FIG. 2 in a lock fail state.

Referring to FIGS. 1 to 8, the driving controller 200 may output the clock training signal SFC and an interface signal USIT to the data driving chips DIC1 to DIC12.

In an embodiment, a low level of the clock training signal SFC may represent the clock training period and a high level of the clock training signal SFC may represent a data period, for example.

The interface signal USIT may include a clock training pattern TRAINING PT corresponding to the clock training period and a data signal DATA corresponding to the data period.

The data driver 500 may operate the clock recovery operation in the clock training period. The clock recovery operation may mean an operation generating a data clock signal in the data driver 500. When the interface between the driving controller 200 and the data driver 500 is a serial interface, the data clock signal may be desired to read a logic level of the data signal. The data driver 500 may operate the clock recovery operation in the clock training period so that the data driver 500 may generate the data clock signal to read the logic level of the data signal.

In an embodiment, as shown in FIG. 7, when the clock recovery operation is normal, the clock recovery signal SBC may have a high level, for example. When the clock recovery operation is normal, a lock fail signal LF representing the lock fail state may have a low level.

In an embodiment, as shown in FIG. 8, when the clock recovery operation is abnormal, the clock recovery signal SBC may have a low level, for example. When the clock recovery operation is abnormal, the lock fail signal LF representing the lock fail state may have a high level.

When the clock recovery operation is changed from abnormal to normal, the clock recovery signal SBC is changed from the low level to the high level. When the clock recovery operation is changed from normal to abnormal, the clock recovery signal SBC is changed from the high level to the low level.

A case in which the clock recovery operation is abnormal may be referred to the lock fail state. The case in which the clock recovery operation is abnormal may be a case in which a damage occurs at the driving controller 200, a case in which a damage occurs at at least one of the data driving chips DIC1 to DIC12, or a case in which a damage occurs at the transmission path between the driving controller 200 and the data driving chips DIC1 to DIC12.

In an embodiment, when the damage occurs at the driving controller 200, the clock recovery signals SBC of all of the data driving chips may represent that the clock recovery operations are abnormal, for example.

In an embodiment, when the damage occurs at one of the data driving chips DIC1 to DIC12, the clock recovery signal SBC of the damaged data driving chip may represent that the clock recovery operation is abnormal, for example.

In an embodiment, when the damage occurs at one of the transmission paths between the driving controller 200 and the data driving chips DIC1 to DIC12, the clock recovery signal SBC of the data driving chip corresponding to the damaged transmission path may represent that the clock recovery operation is abnormal, for example.

Figure 9:
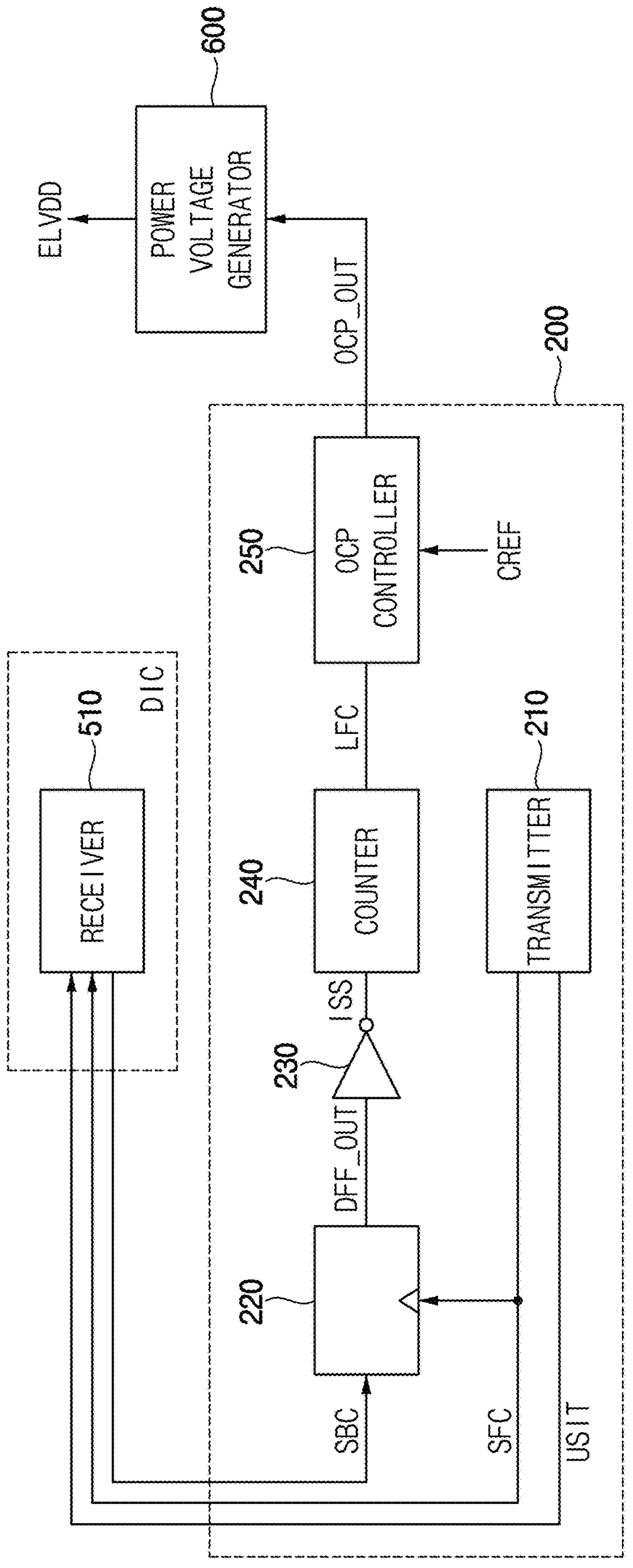
FIG. 9 is a block diagram illustrating the driving controller, the data driving chip and a power voltage generator of FIG. 2.
Figure 10:
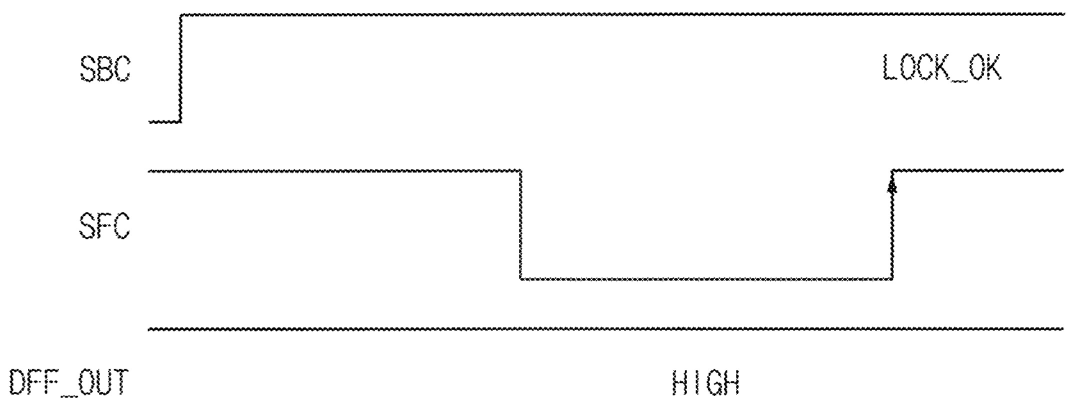
FIG. 10 is a timing diagram illustrating an input signal and an output signal of a flipflop of FIG. 9 in a normal state.
Figure 11:
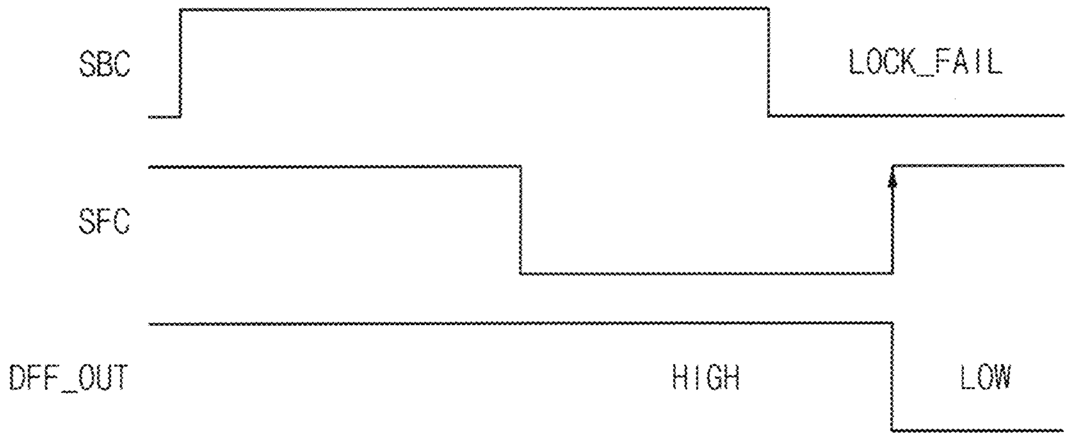
FIG. 11 is a timing diagram illustrating an input signal and an output signal of the flipflop of FIG. 9 in a lock fail state.

FIG. 9 is a block diagram illustrating the driving controller 200, the data driving chip DIC and the power voltage generator 600 of FIG. 2. FIG. 10 is a timing diagram illustrating an input signal and an output signal of a flipflop 220 of FIG. 9 in the normal state. FIG. 11 is a timing diagram illustrating an input signal and an output signal of the flipflop 220 of FIG. 9 in the lock fail state.

Referring to FIGS. 1 to 11, the driving controller 200 may output the clock training signal SFC representing the clock training period to the data driver 500.

The data driver 500 may output the clock recovery signal SBC representing whether the clock recovery operation is normal or abnormal to the driving controller 200. The driving controller 200 may generate an overcurrent signal OCP_OUT representing an overcurrent based on the clock recovery signal SBC and may output the overcurrent signal OCP_OUT to the power voltage generator 600.

When the overcurrent signal OCP_OUT represents an active state, the power voltage generator 600 may not output the power voltage (e.g., ELVDD) to the display panel 100. In an alternative embodiment, when the overcurrent signal OCP_OUT represents the active state, the power voltage generator 600 may reduce the power voltage (e.g., ELVDD) and output the reduced power voltage (e.g., ELVDD) to the display panel 100.

The data driving chip DIC of the data driver 500 may include a receiver 510 receiving the clock training signal SFC and the interface signal USIT from the driving controller 200.

The driving controller 200 may include a transmitter 210 transmitting the clock training signal SFC and the interface signal USIT to the data driving chip DIC.

The driving controller 200 may further include a flipflop 220 receiving the clock recovery signal SBC and the clock training signal SFC and outputting a clock state signal DFF_OUT. In an embodiment, the clock recovery signal SBC may be received through an input terminal of the flipflop 220, for example. In an embodiment, the clock training signal SFC may be received through a clock terminal of the flipflop 220. The clock state signal DFF_OUT may be outputted through an output terminal of the flipflop 220, for example. In an embodiment, the flipflop 220 may be a D-flipflop, for example.

As shown in FIG. 10, when the clock recovery signal SBC represents a normal state (LOCK_OK), the clock state signal DFF_OUT may have a high level at a rising edge of the clock training signal SFC.

As shown in FIG. 11, when the clock recovery signal SBC represents an abnormal state (LOCK_FAIL), the clock state signal DFF_OUT may have a low level at the rising edge of the clock training signal SFC.

Although the clock state signal DFF_OUT has the high level prior to the rising edge of the clock training signal SFC in FIGS. 10 and 11, the invention may not be limited thereto. In an alternative embodiment, the clock state signal DFF_OUT may have the low level prior to the rising edge of the clock training signal SFC.

The driving controller 200 may further include an inverter 230 generating an inverted state signal ISS by inverting the clock state signal DFF_OUT.

The driving controller 200 may further include a counter 240 generating a count signal LFC by counting the inverted state signal ISS.

In the illustrated embodiment, when the clock recovery signal SBC represents the abnormal state (LOCK_FAIL), the clock state signal DFF_OUT may have a low level and the inverted state signal ISS which is generated by inverting the clock state signal DFF_OUT is inputted to the counter 240 so that the counter 240 may count a number of high levels of the inverted state signal ISS to generate the count signal LFC representing a duration of the abnormal state of the clock recovery signal SBC.

The driving controller 200 may further include an overcurrent protection ("OCP") controller 250 setting the overcurrent signal OCP_OUT to have the active state when the count signal LFC exceeds a reference count signal CREF.

The OCP controller 250 may control the overcurrent signal OCP_OUT to have the active state when the duration of the abnormal state of the clock recovery signal SBC exceeds a reference time.

As explained above, when the overcurrent signal OCP_OUT has the active state, the power voltage generator 600 may not output the power voltage (e.g., ELVDD) to the display panel 100. In contrast, when the overcurrent signal OCP_OUT has an inactive state, the power voltage generator 600 may normally output the power voltage (e.g., ELVDD) to the display panel 100.

In the illustrated embodiment, the data driver 500 outputs the clock recovery signal SBC to the driving controller 200 and the driving controller 200 determines the overcurrent based on the clock recovery signal SBC and outputs the overcurrent signal OCP_OUT to the power voltage generator 600. When the power voltage generator 600 receives the overcurrent signal OCP_OUT having the active state, the power voltage generator 600 may not output the power voltage (e.g., ELVDD) to the display panel 100.

Accordingly, when the damage occurs at the driving controller 200, the data driver 500 or the transmission path between the driving controller 200 and the data driver 500, the OCP operation may be operated so that the overheating and the damage of the display panel 100 may be prevented.

Figure 12:
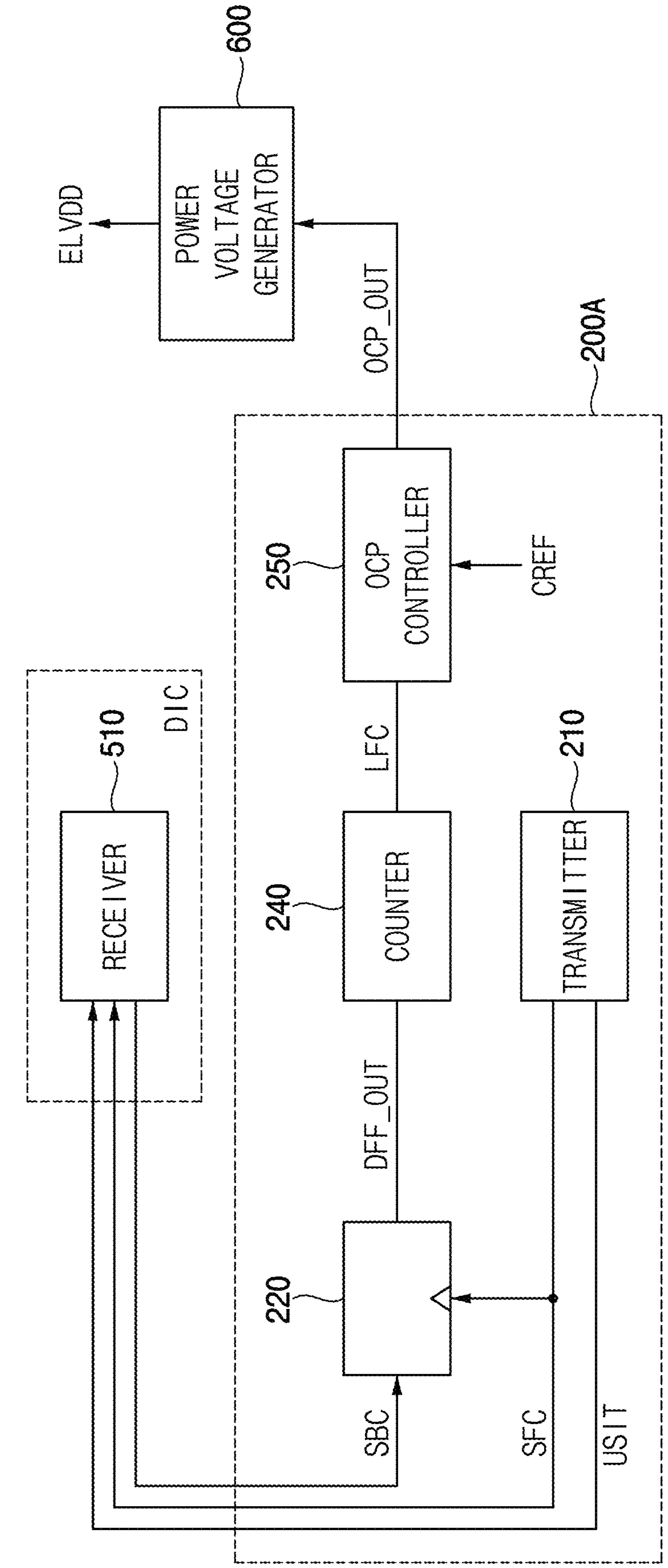
FIG. 12 is a block diagram illustrating an embodiment of a driving controller, a data driving chip and a power voltage generator of a display apparatus according to the invention.

FIG. 12 is a block diagram illustrating an embodiment of a driving controller, a data driving chip and a power voltage generator of a display apparatus according to the invention.

The display apparatus and the method of driving the display apparatus in the embodiment is substantially the same as the display apparatus and the method of driving the display apparatus of the previous embodiment explained referring to FIGS. 1 to 11 except for the structure of the driving controller. Thus, the same reference numerals will be used to refer to the same or like parts as those described in the previous embodiment of FIGS. 1 to 11 and any repetitive explanation concerning the above elements will be omitted.

Referring to FIGS. 1 to 8 and 10 to 12, the display apparatus includes a display panel 100 and a display panel driver. The display panel driver includes a driving controller 200A, a gate driver 300, a gamma reference voltage generator 400 and a data driver 500. The display panel driver may further include a power voltage generator 600.

The driving controller 200A may output the clock training signal SFC representing the clock training period to the data driver 500.

The data driver 500 may output the clock recovery signal SBC representing whether the clock recovery operation is normal or abnormal to the driving controller 200A. The driving controller 200A may generate an overcurrent signal OCP_OUT representing an overcurrent based on the clock recovery signal SBC and may output the overcurrent signal OCP_OUT to the power voltage generator 600.

When the overcurrent signal OCP_OUT represents an active state, the power voltage generator 600 may not output the power voltage (e.g., ELVDD) to the display panel 100. In an alternative embodiment, when the overcurrent signal OCP_OUT represents the active state, the power voltage generator 600 may reduce the power voltage (e.g., ELVDD) and output the reduced power voltage (e.g., ELVDD) to the display panel 100.

The data driving chip DIC of the data driver 500 may include a receiver 510 receiving the clock training signal SFC and the interface signal USIT from the driving controller 200A.

The driving controller 200A may include a transmitter 210 transmitting the clock training signal SFC and the interface signal USIT to the data driving chip DIC.

The driving controller 200A may further include a flipflop 220 receiving the clock recovery signal SBC and the clock training signal SFC and outputting a clock state signal DFF_OUT. In an embodiment, the clock recovery signal SBC may be received through an input terminal of the flipflop 220, for example. In an embodiment, the clock training signal SFC may be received through a clock terminal of the flipflop 220, for example. The clock state signal DFF_OUT may be outputted through an output terminal of the flipflop 220. In an embodiment, the flipflop 220 may be a D-flipflop, for example.

As shown in FIG. 10, when the clock recovery signal SBC represents a normal state (LOCK_OK), the clock state signal DFF_OUT may have a high level at a rising edge of the clock training signal SFC.

As shown in FIG. 11, when the clock recovery signal SBC represents an abnormal state (LOCK_FAIL), the clock state signal DFF_OUT may have a low level at the rising edge of the clock training signal SFC.

The driving controller 200A may further include a counter 240 generating a count signal LFC by counting the clock state signal DFF_OUT.

In the illustrated embodiment, when the clock recovery signal SBC represents the abnormal state (LOCK_FAIL), the clock state signal DFF_OUT may have a low level so that the counter 240 may count a number of low levels of the clock state signal DFF_OUT to generate the count signal LFC representing a duration of the abnormal state of the clock recovery signal SBC.

The driving controller 200A may further include an OCP controller 250 setting the overcurrent signal OCP_OUT to have the active state when the count signal LFC exceeds a reference count signal CREF.

As explained above, when the overcurrent signal OCP_OUT has the active state, the power voltage generator 600 may not output the power voltage (e.g., ELVDD) to the display panel 100. In contrast, when the overcurrent signal OCP_OUT has an inactive state, the power voltage generator 600 may normally output the power voltage (e.g., ELVDD) to the display panel 100.

In the illustrated embodiment, the data driver 500 outputs the clock recovery signal SBC to the driving controller 200A and the driving controller 200A determines the overcurrent based on the clock recovery signal SBC and outputs the overcurrent signal OCP_OUT to the power voltage generator 600. When the power voltage generator 600 receives the overcurrent signal OCP_OUT having the active state, the power voltage generator 600 may not output the power voltage (e.g., ELVDD) to the display panel 100.

Accordingly, when the damage occurs at the driving controller 200A, the data driver 500 or the transmission path between the driving controller 200A and the data driver 500, the OCP operation may be operated so that the overheating and the damage of the display panel 100 may be prevented.

According to the display apparatus and the method of driving the display apparatus of the invention, the overheating and the damage of the display panel may be prevented.

The foregoing is illustrative of the invention and is not to be construed as limiting thereof. Although a few embodiments of the invention have been described, those skilled in the art will readily appreciate that many modifications are possible in the embodiments without materially departing from the novel teachings and advantages of the invention. Accordingly, all such modifications are intended to be included within the scope of the invention as defined in the claims. In the claims, means-plus-function clauses are intended to cover the structures described herein as performing the recited function and not only structural equivalents but also equivalent structures. Therefore, it is to be understood that the foregoing is illustrative of the invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

What is claimed is:

1. A display apparatus comprising:

a display panel which displays an image;

a data driver which outputs a data voltage to the display panel;

a driving controller which controls an operation of the data driver; and a power voltage generator which outputs a power voltage of the display panel, wherein the data driver outputs a clock recovery signal representing whether a clock recovery operation is normal or abnormal to the driving controller, and wherein the driving controller generates an overcurrent signal representing an overcurrent based on the clock recovery signal and outputs the overcurrent signal to the power voltage generator, wherein the power voltage generator outputs the power voltage to the display panel based on the overcurrent signal, wherein the driving controller outputs a clock training signal representing a clock training period to the data driver, wherein the driving controller comprises a flipflop which receives the clock recovery signal and the clock training signal and outputs a clock state signal.

2. The display apparatus of claim 1, wherein when the overcurrent signal has an active state, the power voltage generator does not output the power voltage.

3. The display apparatus of claim 1, wherein when the clock recovery signal represents a normal state, the clock state signal has a high level at a rising edge of the clock training signal.

4. The display apparatus of claim 3, wherein when the clock recovery signal represents an abnormal state, the clock state signal has a low level at the rising edge of the clock training signal.

5. The display apparatus of claim 1, wherein the driving controller further comprises:

an inverter which generates an inverted state signal by inverting the clock state signal; and a counter which generates a count signal by counting the inverted state signal.

6. The display apparatus of claim 5, wherein the driving controller further comprises an overcurrent protection controller which sets the overcurrent signal to have the active state when the count signal exceeds a reference count signal.

7. The display apparatus of claim 1, wherein the driving controller further comprises a counter which generates a count signal by counting the clock state signal.

8. The display apparatus of claim 7, wherein the driving controller further comprises an overcurrent protection controller which sets the overcurrent signal to have the active state when the count signal exceeds a reference count signal.

9. The display apparatus of claim 1, wherein an interface signal outputted from the driving controller to the data driver includes a clock training pattern corresponding to the clock training period and a data signal corresponding to a data period, and wherein the data driver operates the clock recovery operation in the clock training period.

10. The display apparatus of claim 9, wherein when the clock recovery operation is normal, the clock recovery signal has a high level, and wherein when the clock recovery operation is abnormal, the clock recovery signal has a low level.

11. The display apparatus of claim 1, further comprising:

a control board on which the driving controller is disposed;

a first printed circuit board;

a second printed circuit board;

a flexible film connected to the second printed circuit board and the control board; and a U-film connected to the first printed circuit board and the second printed circuit board.

12. The display apparatus of claim 11, further comprising:

a plurality of first data films connected between the first printed circuit board and the display panel;

a plurality of first data driving chips disposed on the plurality of first data films;

a plurality of second data films connected between the second printed circuit board and the display panel; and a plurality of second data driving chips disposed on the plurality of second data films.

13. The display apparatus of claim 12, wherein the clock recovery signal outputted from the first data driving chip is transmitted to the driving controller through a first data film of the plurality of first data films, the first printed circuit board, the U-film, the second printed circuit board, the flexible film and the control board.

14. A method of driving a display apparatus, the method comprising:

outputting a clock recovery signal representing whether a clock recovery operation of a data driver is normal or abnormal to a driving controller;

generating an overcurrent signal by the driving controller representing an overcurrent based on the clock recovery signal;

outputting the overcurrent signal to a power voltage generator;

outputting a power voltage to a display panel based on the overcurrent signal by the power voltage generator; and outputting a data voltage to the display panel using the data driver, wherein the driving controller outputs a clock training signal representing a clock training period to the data driver, and wherein the driving controller comprises a flipflop which receives the clock recovery signal and the clock training signal and outputs a clock state signal.

15. The method of claim 14, wherein when the overcurrent signal has an active state, the power voltage generator does not output the power voltage.

16. The method of claim 14 wherein when the clock recovery signal represents a normal state, the clock state signal has a high level at a rising edge of the clock training signal, and wherein when the clock recovery signal represents an abnormal state, the clock state signal has a low level at the rising edge of the clock training signal.

17. The method of claim 14, wherein an interface signal outputted from the driving controller to the data driver includes a clock training pattern corresponding to the clock training period and a data signal corresponding to a data period, and wherein the data driver operates the clock recovery operation in the clock training period, wherein when the clock recovery operation is normal, the clock recovery signal has a high level, and wherein when the clock recovery operation is abnormal, the clock recovery signal has a low level.

* * * * *